United States Patent
Jung et al.

(10) Patent No.: US 8,675,727 B2
(45) Date of Patent: Mar. 18, 2014

(54) METHOD AND APPARATUS FOR SVC VIDEO AND AAC AUDIO SYNCHRONIZATION USING NPT

(75) Inventors: Soon-Heung Jung, Daejeon (KR); Jeong Ju Yoo, Daejeon (KR); Jin Woo Hong, Daejeon (KR); Kwang-Deok Seo, Wonju-si (KR); WonSup Chi, Wonju-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 748 days.

(21) Appl. No.: 12/735,828

(22) PCT Filed: Dec. 31, 2008

(86) PCT No.: PCT/KR2008/007859
§ 371 (c)(1),
(2), (4) Date: Aug. 19, 2010

(87) PCT Pub. No.: WO2009/104869
PCT Pub. Date: Aug. 27, 2009

(65) Prior Publication Data
US 2010/0329360 A1    Dec. 30, 2010

(30) Foreign Application Priority Data
Feb. 20, 2008 (KR) .................. 10-2008-0015154
Mar. 18, 2008 (KR) .................. 10-2008-0025042

(51) Int. Cl.
*H04B 1/66* (2006.01)
(52) U.S. Cl.
USPC ...................................................... 375/240
(58) Field of Classification Search
USPC .................................................. 375/240.28
See application file for complete search history.

(56) References Cited

U.S. PATENT DOCUMENTS

| 6,065,050 A * | 5/2000 | DeMoney ............ 709/219 |
| 7,761,789 B2 * | 7/2010 | Erol et al. ............ 715/249 |
| 7,978,827 B1 * | 7/2011 | Becker et al. .......... 379/52 |

(Continued)

FOREIGN PATENT DOCUMENTS

KR    10-2005-0085289    8/2005

OTHER PUBLICATIONS

ISO, Information technology—Generic coding of moving pictures and associated audio information: Systems, Dec. 1, 2000, 2nd Edition, pp. 174.*

(Continued)

*Primary Examiner* — Sath V Perungavoor
*Assistant Examiner* — Peter D Le
(74) *Attorney, Agent, or Firm* — Staas & Halsey LLP

(57) ABSTRACT

A method of supporting synchronization of Scalable Video Coding (SVC) information and Advanced Audio Coding (AAC) information using a Normal Play Time (NPT), the method including: receiving video information using a decoding apparatus; receiving audio information using the decoding apparatus; calculating the NPT of the video information using a Real-time Transport Protocol (RTP) time stamp included in the received video information; calculating the NPT of the audio information using the RTP time stamp included in the received audio information; comparing the NPT of the video information and the NPT of the audio information to calculate a difference value; determining whether the calculated difference value is included in a specific synchronization region; and outputting the audio information and the video information when the calculated difference value is determined to be included in the specific synchronization region.

10 Claims, 7 Drawing Sheets

(56) References Cited

U.S. PATENT DOCUMENTS

| | | | |
|---|---|---|---|
| 2004/0228367 A1* | 11/2004 | Mosig | 370/503 |
| 2005/0190872 A1* | 9/2005 | Seong et al. | 375/354 |
| 2005/0217462 A1* | 10/2005 | Thomson et al. | 84/612 |
| 2005/0244149 A1* | 11/2005 | Okuyama | 386/126 |
| 2005/0259947 A1 | 11/2005 | Wang et al. | |
| 2006/0072399 A1* | 4/2006 | Fujimoto et al. | 369/47.1 |
| 2006/0184790 A1 | 8/2006 | Oliveira et al. | |
| 2007/0094579 A1* | 4/2007 | Cerrato Sanchez | 714/776 |
| 2007/0168852 A1* | 7/2007 | Erol et al. | 715/500.1 |
| 2009/0031361 A1* | 1/2009 | Song et al. | 725/62 |
| 2009/0034629 A1* | 2/2009 | Suh et al. | 375/240.27 |
| 2009/0040997 A1* | 2/2009 | Oh et al. | 370/345 |
| 2009/0164652 A1* | 6/2009 | Slobotskoy et al. | 709/231 |
| 2009/0241163 A1* | 9/2009 | Seo | 725/139 |

OTHER PUBLICATIONS

Scott Firestone et al., Voice and Video Conferencing Fundamentals, Mar. 16, 2007, Chapter 7.*

International Search Report and Written Opinion issued Jun. 29, 2009 in corresponding International Application No. PCT/KR2008/007859.

* cited by examiner

METHOD AND APPARATUS FOR SVC VIDEO AND AAC AUDIO SYNCHRONIZATION USING NPT

CROSS REFERENCE TO RELATED APPLICATIONS

This application is a continuation of and claims the benefit of International Application No. PCT/KR2008/007859, filed Dec. 31, 2008, and claims the benefit of Korean Application No. 10-2008-0025042, filed Mar. 18, 2008, and Korean Application No. 10-2008-0015154, filed Feb. 20, 2008, the disclosures of all of which are incorporated herein by reference.

TECHNICAL FIELD

The present invention relates to a method and apparatus for supporting synchronization of Scalable Video Coding (SVC) information and Advanced Audio Coding (AAC) information using a Normal Play Time (NPT), and more particularly, to a method and apparatus for supporting synchronization with respect to video and audio using an NPT induced from time stamp information to be recorded in a header of a Real-time Transport Protocol (RTP) packet when performing RTP packetization of the SVC information and the AAC information and transmitting the SVC information and the AAC information in an Internet Protocol (IP) network such as the Internet.

This work was supported by the IT R&D program of MIC/IITA [2005-S-103-03, Development of Ubiquitous Content Access Technology for Convergence of Broadcasting and Communications].

BACKGROUND ART

Generally, a Real-time Transport Protocol (RTP) packet is used for transmitting media data in order to transmit video/audio using an Internet Protocol (IP) network, and an RTP Control Protocol (RTCP) packet is used for secondarily cooperating with the RTP packet.

In particular, one of various important functions of the RTCP packet is providing media synchronization information. Since the video and the audio are different media, a media sampling rate for acquiring an access unit corresponding to a unit of RTP packetization is different from each other.

Accordingly, the video and the audio need to be transmitted using each different RTP session. Information used for synchronization in a header corresponds to a "time stamp" field, and a value is independently generated for each video/audio access unit based on the sampling rate of the video and the audio.

Since the video and the audio independently generate a "time stamp" value, synchronization between the video and the audio may not be performed using only "time stamp" information. Accordingly, time information to which a video stream and an audio stream may be commonly referred is required for providing synchronization between the video and the audio.

A method of providing common time information uses an RTCP Sender Report (SR) packet. A "Normal Play Time (NPT) time stamp" field provides the common time information to which the video and the audio are commonly referred, and an "RTP time stamp" field records an RTP time stamp of the video or the audio corresponding to an "NPT time stamp".

Accordingly, each RTP time stamp value by which synchronization between the video and the audio is performed by a medium of the "NPT time stamp" may be estimated. Each RTCP session is generated for each of a video session and an audio session, and is transmitted to be within 5% of the total traffic. Each time the RTCP session is periodically transmitted, the RTP time stamp of each media corresponding to the NPT time stamp is recorded in the RTCP packet and is transmitted, thereby enabling a receiver to acquire the information required for synchronization.

As described above, since a legacy media synchronization method requires the "time stamp" information of the RTP packet and transmission of the RTCP SR packet periodically providing the NPT time stamp value, complexity or a processing process is complex.

In particular, when an amount of traffic of a network is excessive, a congestion problem of the network may worsen due to the RTCP SR packet transmission.

DISCLOSURE OF INVENTION

Technical Goals

The present invention provides a method of calculating a Normal Play Time (NPT) of audio information and video information using a Real-time Transport Protocol (RTP) time stamp.

The present invention also provides a method of inducing an NPT from a time stamp value with respect to a received video and a received audio to provide synchronization between two media.

The present invention also provides a method of inducing an NPT using only an RTP time stamp by eliminating a separate need for transmitting and processing an RTP Control Protocol Sender Report (RTCP SR) packet of video information and audio information.

The present invention also provides a method of reducing a number of User Datagram Protocol (UDP) ports required for transmitting an RTCP packet, and reducing an amount of control traffic coming into a network since RTCP packet transmission is unnecessary.

Technical Solutions

According to an aspect of the present invention, there is provided a method of extracting a Normal Play Time (NPT) of Scalable Video Coding (SVC) information using a Real-time Transport Protocol (RTP) time stamp, the method including: receiving video information from a decoding apparatus; extracting a specific output screen RTP time stamp of the video information; calculating a difference value by subtracting a first output screen RTP time stamp of the video information from the extracted specific output screen RTP time stamp of the video information; and defining, as the NPT of the video information, a value calculated by dividing the difference value by a sampling rate with respect to an access unit of the video information.

According to another aspect of the present invention, there is provided a method of extracting an NPT of Advanced Audio Coding (AAC) information using an RTP time stamp, the method including: receiving audio information from a decoding apparatus; extracting a specific output screen RTP time stamp of the audio information; calculating a difference value by subtracting a first output screen RTP time stamp of the audio information from the extracted specific output screen RTP time stamp of the audio information; and defining, as the NPT of the audio information, a value calculated by dividing the difference value by a sampling rate with respect to an access unit of the audio information.

According to still another aspect of the present invention, there is provided a method of supporting synchronization of SVC information and AAC information using an NPT, the method including: receiving video information using a decoding apparatus; receiving audio information using the decoding apparatus; calculating the NPT of the video information using an RTP time stamp included in the received video information; calculating the NPT of the audio information using the RTP time stamp included in the received audio information; comparing the NPT of the video information and the NPT of the audio information to calculate a difference value; determining whether the calculated difference value is included in a specific synchronization region; and outputting the audio information and the video information when the calculated difference value is determined to be included in the specific synchronization region.

In an aspect of the present invention, the method further includes: determining a display interval of the video information and the audio information to adjust the display interval between screens of the video information when the calculated difference value is determined to be excluded from the specific synchronization region.

According to yet another aspect of the present invention, there is provided an apparatus for supporting synchronization of SVC information and AAC information using an NPT, the apparatus including: an information receiving unit to receive video information and audio information using a decoding apparatus; a video information analysis unit to calculate the NPT of the video information using an RTP time stamp included in the received video information; an audio information analysis unit to calculate the NPT of the audio information using the RTP time stamp included in the received audio information; a calculation unit to compare the NPT of the video information and the NPT of the audio information to calculate a difference value; a determination unit to determine whether the calculated difference value is included in a specific synchronization region; and an output unit to output the audio information and the video information when the calculated difference value is determined to be included in the specific synchronization region.

In an aspect of the present invention, the apparatus further includes: a display interval adjustment unit to determine a display interval of the video information and the audio information to adjust the display interval between screens of the video information when the calculated difference value is determined to be excluded from the specific synchronization region.

BEST MODE FOR CARRYING OUT THE INVENTION

Figure 1:
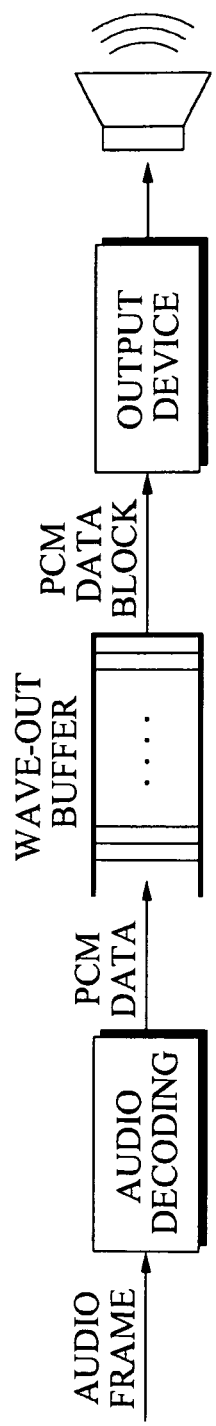
FIG. 1 illustrates a process of playing a single audio frame as Pulse Code Modulation (PCM) data and inputting and outputting the PCM data to a wave-out buffer after the single audio frame is decoded according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

An apparatus for supporting synchronization according to an exemplary embodiment of the present invention is based on an apparatus for synchronizing video information and audio information to process a piece of media information.

An exemplary embodiment of the present invention uses a Normal Play Time (NPT) acquired from a Real-time Transport Protocol (RTP) time stamp in order to match synchronization of Scalable Video Coding (SVC) information and Advanced Audio Coding (AAC) information.

Accordingly, an exemplary embodiment of the present invention discloses a method of inducing each NPT using only the RTP time stamp included in the SVC information and the AAC information, and the method is described below with reference to related Equations.

First, a method of inducing the NPT of the SVC information (hereinafter, referred to as 'video information') is disclosed.

In an exemplary embodiment of the present invention, $\mathrm{NPT}_{V_o}^k$ corresponding to an NPT of a k-th video screen in which the video information received from a decoding apparatus is outputted to a display apparatus may be induced using RTP time stamp information by Equation 1:

$$\mathrm{NPT}_{V_o}^k = (\mathrm{RTPT}_{V_o}^k - \mathrm{RTPT}_{V_o}^1)/\mathrm{SR}_V, \quad \text{[Equation 1]}$$

where $\mathrm{RTPT}_{V_o}^1$ denotes an RTP time stamp of a first output screen (an Instantaneous Decoding Refresh (IDR) picture), $\mathrm{RTPT}_{V_o}^k$ denotes an RTP time stamp of a k-th output screen, and $\mathrm{SR}_V$ denotes a sampling rate with respect to an access unit of video in a transmitter.

90 KHz may be generally applied to $\mathrm{SR}_V$ with respect to the video information, however, $\mathrm{SR}_V$ is not limited to this value, and a time stamp value with respect to each screen is generated based on $\mathrm{SR}_V$.

Since an outputted unit corresponds to an inconsecutive individual screen in the case of the video information, the NPT may be easily acquired for each output screen as described above.

However, since an output unit of the audio information corresponds to a consecutive Pulse Code Modulation (PCM) data block, the output unit may not be classified and the NPT may not be directly acquired. In order to solve the above-described problem, an exemplary embodiment of the present invention discloses a method of acquiring the NPT with respect to the audio information using a size of a wave-out buffer remaining before PCM data is outputted.

FIG. 1 illustrates a process of playing a single audio frame as PCM data and inputting and outputting the PCM data to a wave-out buffer after the single audio frame is decoded according to an exemplary embodiment of the present invention.

As illustrated in FIG. 1, the audio information is played as the PCM data, and is inputted/outputted to the wave-out buffer, and audio compression data extracted from an RTP packet for each frame is periodically decoded and is played as the PCM data, and the played PCM data is consecutively stored in the wave-out buffer.

A PCM data block stored in the wave-out buffer is transmitted to an output device, and is outputted to a speaker by a device driver. A size of the wave-out buffer is always set as a constant value $t_{buff}$ for audio output of a continuously constant speed.

An exemplary embodiment of the present invention may estimate $RTPT_{A_o}^s$ corresponding to an RTP time stamp with respect to an s-th PCM data block to be outputted to the wave-out buffer based on the above-described process of processing audio data using Equation 2:

$$RTPT_{A_o}^s = RTPT_{A_i}^n - (t_{buff} \times SR_A),\qquad \text{[Equation 2]}$$

where $RTPT_{A_i}^n$ denotes an RTP time stamp value of n-th PCM data inputted into a wave-out buffer at a time when $RTPT_{A_i}^n$ is calculated, and $SR_A$ denotes a sampling rate with respect to a frame corresponding to a basic access unit of audio.

A frequency up to a maximum of 48 KHz may be applied to the AAC information, however, the AAC information is not limited to this value.

Accordingly, $NPT_{A_o}^s$ corresponding to the NPT of the s-th PCM data block to be directly outputted to the speaker may be calculated using Equation 3:

$$NPT_{A_o}^s = (RTPT_{A_o}^s - RTPT_{A_o}^1)/SR_A,\qquad \text{[Equation 3]}$$

where $RTPT_{A_o}^1$ denotes a time stamp value of a PCM data block being first outputted.

Figure 2:
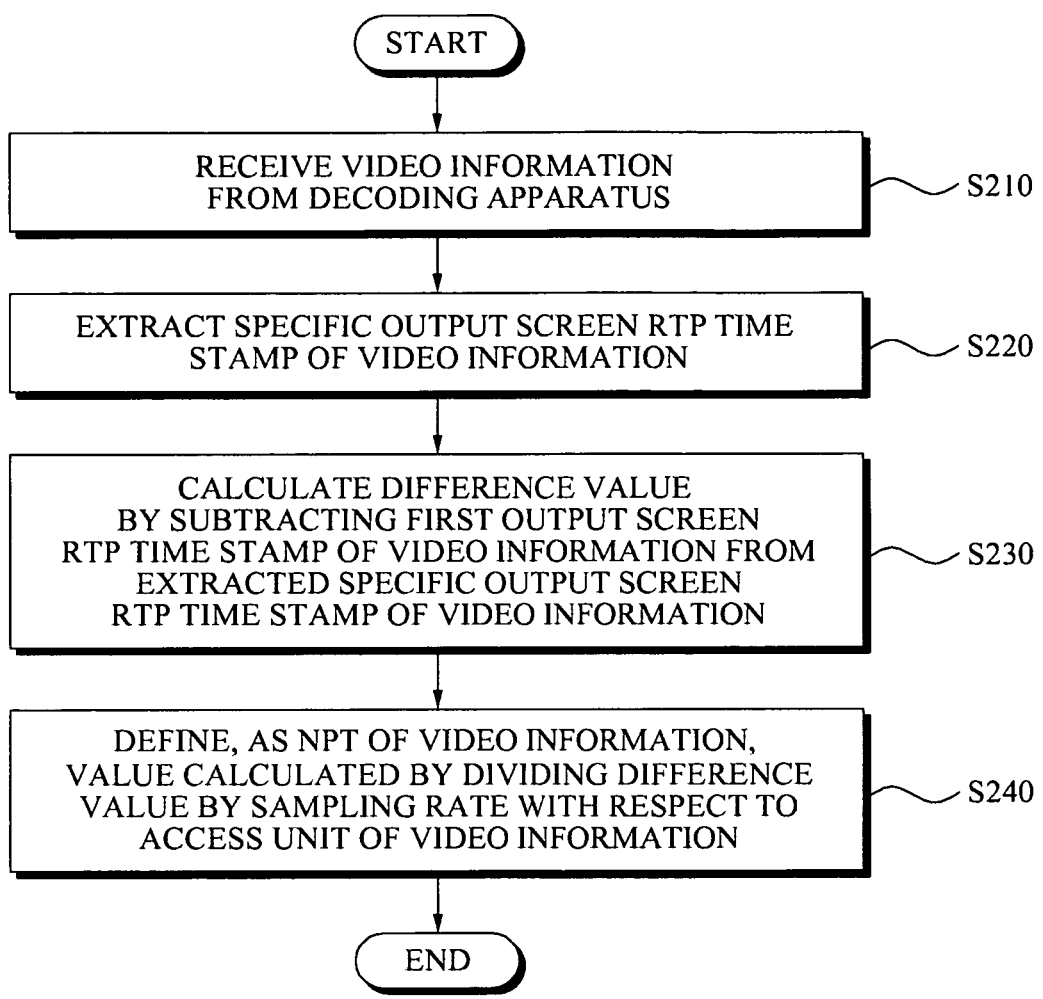
FIG. 2 is a flowchart illustrating a method of extracting a Normal Play Time (NPT) of Scalable Video Coding (SVC) information using a Real-time Transport Protocol (RTP) time stamp according to an exemplary embodiment of the present invention.
Figure 3:
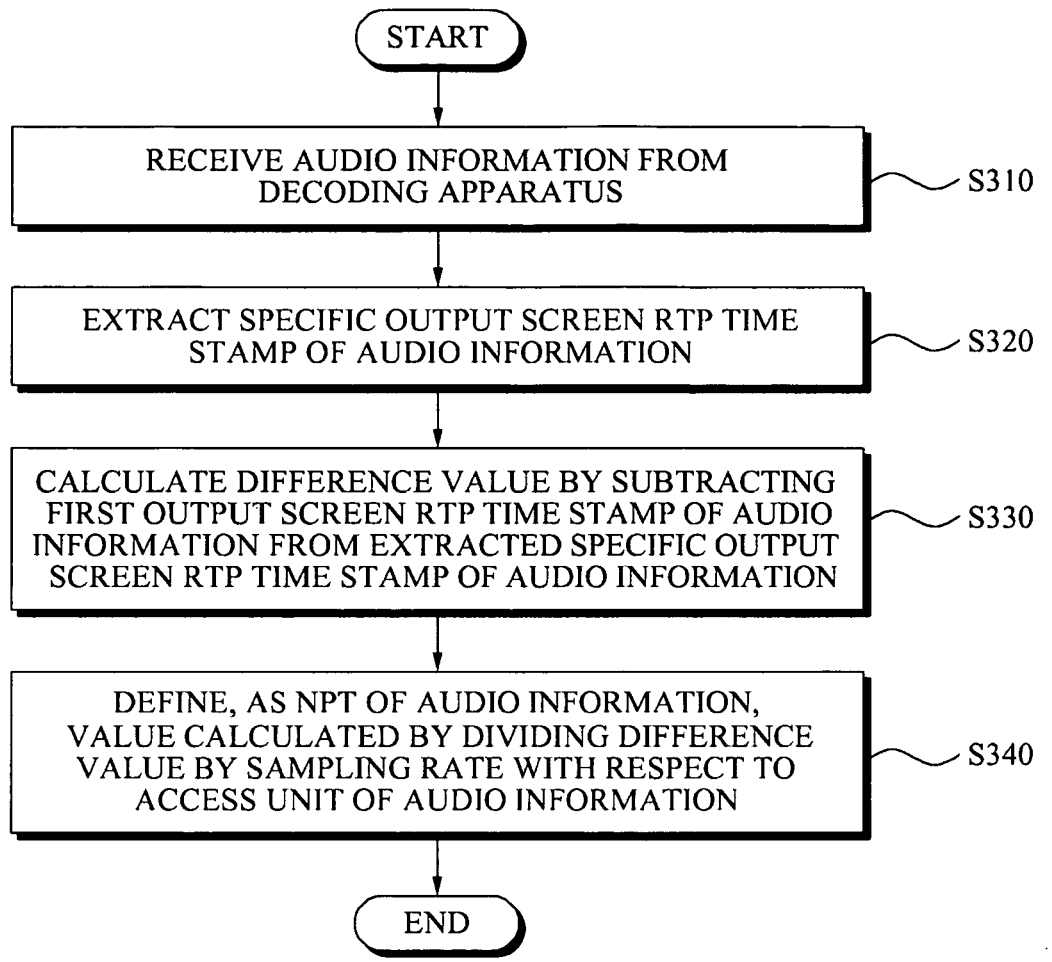
FIG. 3 is a flowchart illustrating a method of extracting an NPT of Advanced Audio Coding (AAC) information using an RTP time stamp according to an exemplary embodiment of the present invention.

As described above, an exemplary embodiment of the present invention discloses a method of extracting the NPT of each piece of information using the RTP time stamp of the video information and the audio information. Referring to FIGS. 2 and 3, a method of acquiring the NPT of the video information and the NPT of the audio information is described below for each operation.

First, a method of extracting an NPT of SVC information using an RTP time stamp according to an exemplary embodiment of the present invention is described.

FIG. 2 is a flowchart illustrating a method of extracting an NPT of SVC information using an RTP time stamp according to an exemplary embodiment of the present invention.

First, in operation S210, the method receives video information from a decoding apparatus.

An exemplary embodiment of the present invention receives the SVC information being currently and widely used as the video information and being stable, however, an exemplary embodiment of the present invention is not limited to the SVC information.

In operation S220, the method subsequently extracts a specific output screen RTP time stamp of the video information.

In operation S230, the method subsequently calculates a difference value by subtracting a first output screen RTP time stamp of the video information from the extracted specific output screen RTP time stamp of the video information.

In operation S240, the method subsequently defines, as the NPT of the video information, a value calculated by dividing the difference value by a sampling rate with respect to an access unit of the video information.

Each operation may be performed based on the above-described Equation 1.

A method of extracting an NPT of AAC information using an RTP time stamp according to an exemplary embodiment of the present invention is also described.

FIG. 3 is a flowchart illustrating a method of extracting an NPT of AAC information using an RTP time stamp according to an exemplary embodiment of the present invention.

In operation S310, the method receives audio information from a decoding apparatus.

An exemplary embodiment of the present invention receives the AAC information being currently and widely used as the audio information and being stable, however, an exemplary embodiment of the present invention is not limited to the AAC information.

In operation S320, the method subsequently extracts a specific output screen RTP time stamp of the audio information.

The specific output screen RTP time stamp of the audio information corresponds to a value of subtracting, from an RTP time stamp value of specific PCM data inputted into a wave-out buffer at a time when the specific output screen RTP time stamp of the audio information is calculated, a value calculated by multiplying a wave-out buffer value and a sampling rate with respect to a basic access unit of the audio information.

In operation S330, the method subsequently calculates a difference value by subtracting a first output screen RTP time stamp of the audio information from the extracted specific output screen RTP time stamp of the audio information.

In operation S340, the method subsequently defines, as the NPT of the audio information, a value calculated by dividing the difference value by the sampling rate with respect to an access unit of the audio information.

Each operation may be performed based on the above-described Equations 2 and 3.

As described above, an exemplary embodiment of the present invention may calculate the NPT using the RTP time stamp, and may provide an optimized synchronization algorithm using the calculated NPT with respect to the video information and the audio information.

A basic synchronization principle according to an exemplary embodiment of the present invention may compare an NPT of a video screen to be outputted and the NPT of audio PCM data to be outputted simultaneously with the screen to adjust a display interval of the video screen.

Since the audio information is more important than the video information, an exemplary embodiment of the present invention may provide an apparatus for comparing the NPT of the video information and the NPT of the audio information to adjust a video display speed in order to enable the audio information to be continuously outputted regardless of the video information and to be synchronized with the outputted audio information.

A configuration of an apparatus for supporting synchronization of SVC information and AAC information using an NPT according to an exemplary embodiment of the present invention is sequentially described with reference to FIG. 4.

Figure 4:
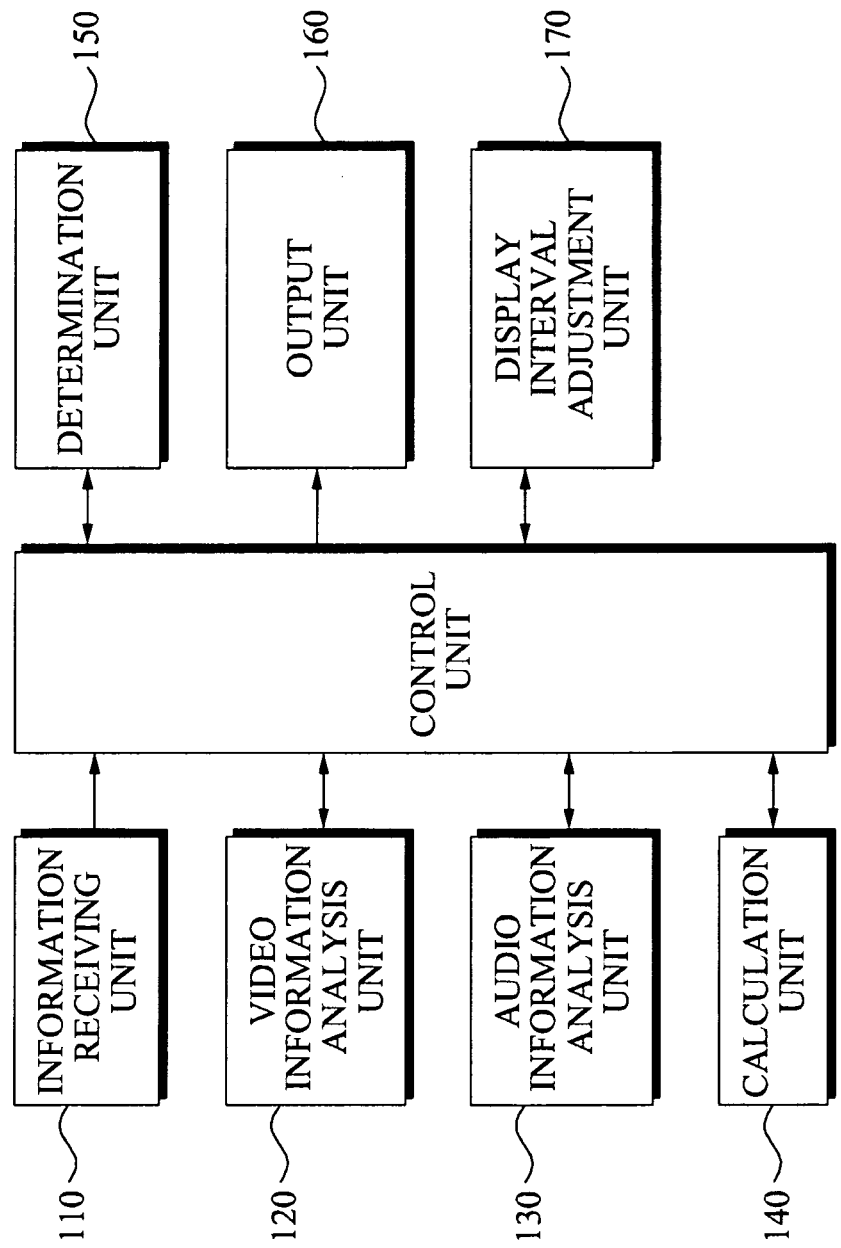
FIG. 4 is a block diagram illustrating a configuration of an apparatus for supporting synchronization of SVC information and AAC information using an NPT according to an exemplary embodiment of the present invention.

FIG. 4 is a block diagram illustrating a configuration of an apparatus for supporting synchronization of SVC information and AAC information using an NPT according to an exemplary embodiment of the present invention.

First, an information receiving unit 110 receives video information and audio information using a decoding apparatus.

As described above, the video information may correspond to the SVC information, and the audio information may correspond to the AAC information, however, the video information and the audio information are not limited to the above-described information formats.

An exemplary embodiment of the present invention subsequently analyzes the received video information and the received audio information to calculate the NPT of each piece of information, and a calculation process is described below with reference to FIG. 5.

Figure 5:
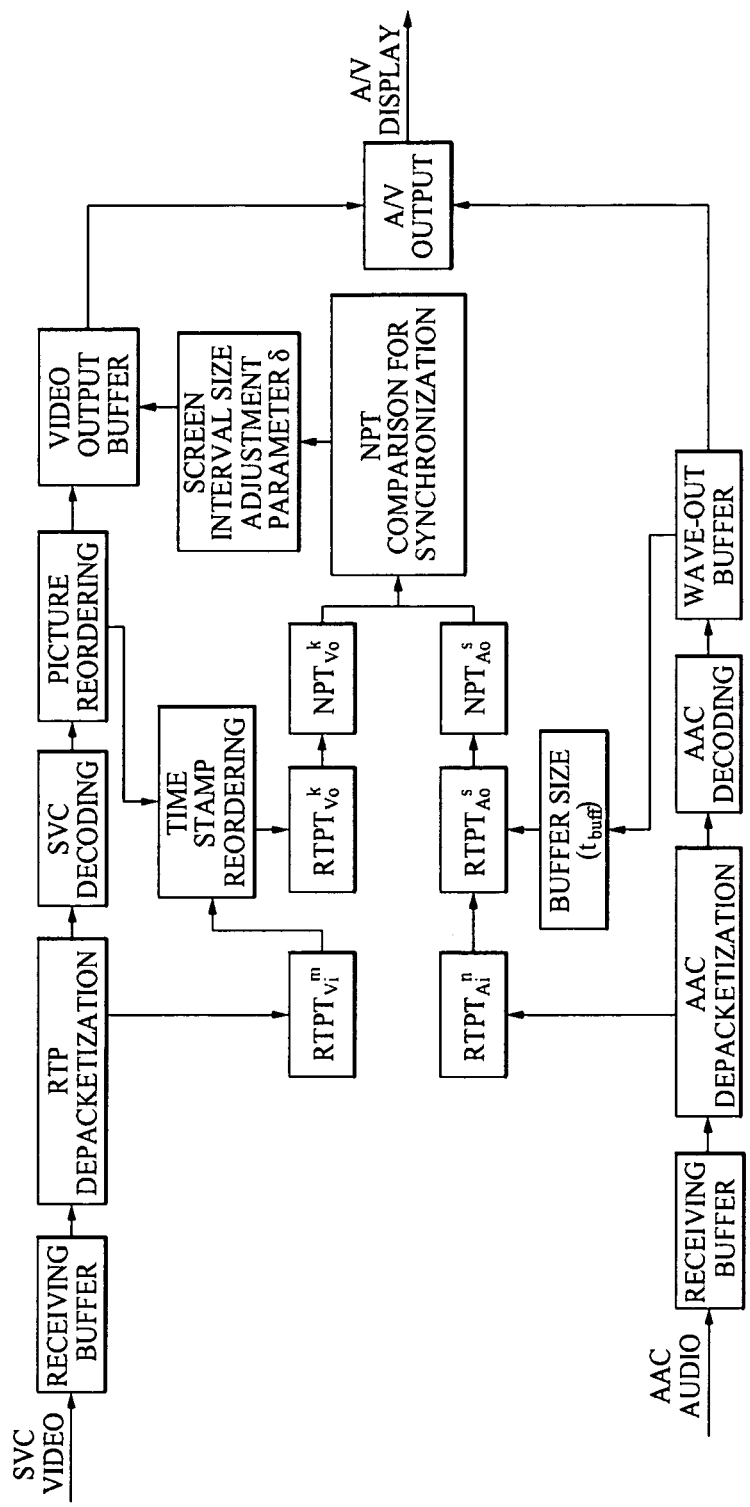
FIG. 5 is a block diagram illustrating a synchronization algorithm of video information and audio information using an NPT according to an exemplary embodiment of the present invention.

FIG. 5 is a block diagram illustrating a synchronization algorithm of video information and audio information using an NPT according to an exemplary embodiment of the present invention.

A video information analysis unit 120 calculates the NPT of the video information using an RTP time stamp included in the received video information.

The video information analysis unit 120 according to an exemplary embodiment of the present invention may define, as the NPT of the video information, a value of dividing a value calculated by subtracting a first output screen RTP time stamp of the video information from a specific output screen RTP time stamp of the video information by a sampling rate with respect to an access unit of the video information.

In the case of the video information, an exemplary embodiment of the present invention extracts $RTPT_{V_i}^m$ corresponding to a time stamp for each screen from a received RTP packet, and finds $RTPT_{V_o}^k$ for each output screen according to a screen display sequence based on screen sequence reordering considering a B-picture. An exemplary embodiment of the present invention may calculate $NPT_{V_o}^k$ corresponding to an NPT of a k-th output screen using the above-described Equation 1 based on $RTPT_{V_o}^k$.

An audio information analysis unit 130 calculates the NPT of the audio information using the RTP time stamp included in the received audio information The audio information analysis unit 130 according to an exemplary embodiment of the present invention may define, as the NPT of the audio information, a value of dividing a value calculated by subtracting a first output screen RTP time stamp of the audio information from a specific output screen RTP time stamp of the audio information by a sampling rate with respect to an access unit of the audio information.

The specific output screen RTP time stamp of the audio information may be defined as a value of subtracting, from an RTP time stamp value of specific PCM data inputted into a wave-out buffer at a time when the specific output screen RTP time stamp of the audio information is calculated, a value calculated by multiplying a wave-out buffer value and the sampling rate with respect to a basic access unit of the audio information.

In the case of the audio information, an exemplary embodiment of the present invention performs AAC decoding for each audio frame being loaded in an RTP and arriving to restore PCM data.

An exemplary embodiment of the present invention may extract $RTPT_{A_i}^n$ corresponding to the RTP time stamp of the audio frame sequentially arriving from an RTP packet header simultaneous with the above-described process. An exemplary embodiment of the present invention may extract $NPT_{A_o}^s$ corresponding to a time stamp of a PCM data block to be outputted using the above-described Equation 2 based on $RTPT_{A_i}^n$.

An exemplary embodiment of the present invention may calculate $NPT_{A_o}^s$ corresponding to the NPT of the PCM data block to be outputted using the above-described Equation 3.

When a screen to be outputted is assumed as a k-th screen and a PCM data block of audio to be synchronized with the screen is assumed as an s-th PCM data block, an exemplary embodiment of the present invention compares $NPT_{V_o}^k$ and $NPT_{A_o}^s$, and adjusts a display interval of a video screen to match synchronization.

A synchronization process of the video information and the audio information according to an exemplary embodiment of the present invention is described below in detail.

First, a calculation unit 140 compares the NPT of the video information and the NPT of the audio information to calculate a difference value.

The calculation unit 140 may define, as the difference value, a value of subtracting an NPT value of the audio information from the NPT value of the video information.

The difference value $T_s$ $NPT_{V_o}^k$ and $NPT_{A_o}^s$ to be used for the NPT comparing may be acquired by Equation 4:

$$T_s = NPT_{V_o}^k - NPT_{A_o}^s. \qquad \text{[Equation 4]}$$

A determination unit 150 determines whether the calculated difference value is included in a specific synchronization region. When the calculated difference value is determined to be included in the specific synchronization region, an output unit 160 outputs the audio information and the video information.

When $|T_s|$ is within $\eta$ corresponding to the established synchronization region (an in-sync region), synchronization is determined to be matched, and the video screen is displayed at display intervals based on a screen rate established by a Temporal Identifier (TID).

However, when the calculated difference value is determined by the determination unit 150 to be excluded from the specific synchronization region, an exemplary embodiment of the present invention determines a display interval of the video information and the audio information to adjust the display interval between screens of the video information using a display interval adjustment unit 170.

When $|T_s|$ is outside $\eta$, the display interval adjustment unit 170 according to an exemplary embodiment of the present invention may determine whether the video information corresponds to an output state faster or slower than the audio information to adjust the display interval between screens of the video information.

Figure 6:
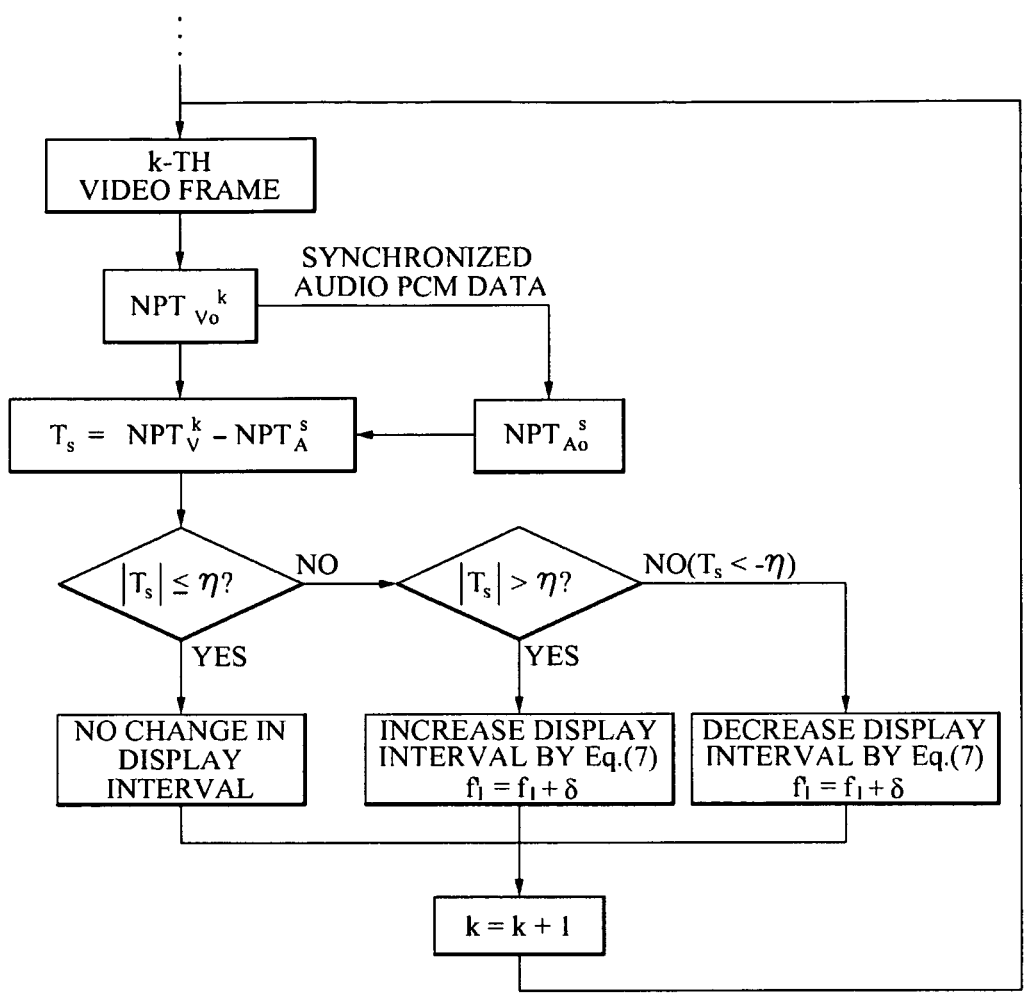
FIG. 6 is a flowchart illustrating NPT processing for synchronization of audio information and video information according to an exemplary embodiment of the present invention.

FIG. 6 is a flowchart illustrating NPT processing for synchronization of audio information and video information according to an exemplary embodiment of the present invention.

A display interval value between screens of the video information may be defined as a value of summing a value calculated by dividing 1000 by an established screen rate and a screen interval size adjustment parameter.

The display interval of the video information $f_1$ may be calculated by a predetermined screen rate $f_R$ in accordance with Equation 5:

$$f_1 = 1000/f_R. \qquad \text{[Equation 5]}$$

The screen interval size adjustment parameter may be defined as a value of multiplying the difference value calculated by comparing the NPT of the video information and the NPT of the audio information, and a scale factor.

When $|T_s|$ is outside $\eta$, a size of the screen interval size adjustment parameter $\delta$ may be determined by a scale factor $s_f$, and may be represented as Equation 6:

$$\delta = T_s \cdot s_{f(ms)} \qquad \text{[Equation 6]}$$

When synchronization is not performed, $s_f$ may adjust a convergence speed for matching synchronization again and may verify that a value of about 0.05 to 0.1 is appropriate, using an experiment.

In an exemplary embodiment of the present invention, $f_f'$ corresponding to the screen display interval adjusted by $\delta$ may be calculated in accordance with Equation 7:

$$f_f' = f_f + \delta$$

As described above, an exemplary embodiment of the present invention may provide the method of supporting synchronization of the video information and the audio information using the NPT induced from time stamp information to be recorded in a header of an RTP packet when performing RTP packetization of the video information and the audio information in an Internet Protocol (IP) network and transmitting the video information and the audio information.

Figure 7:
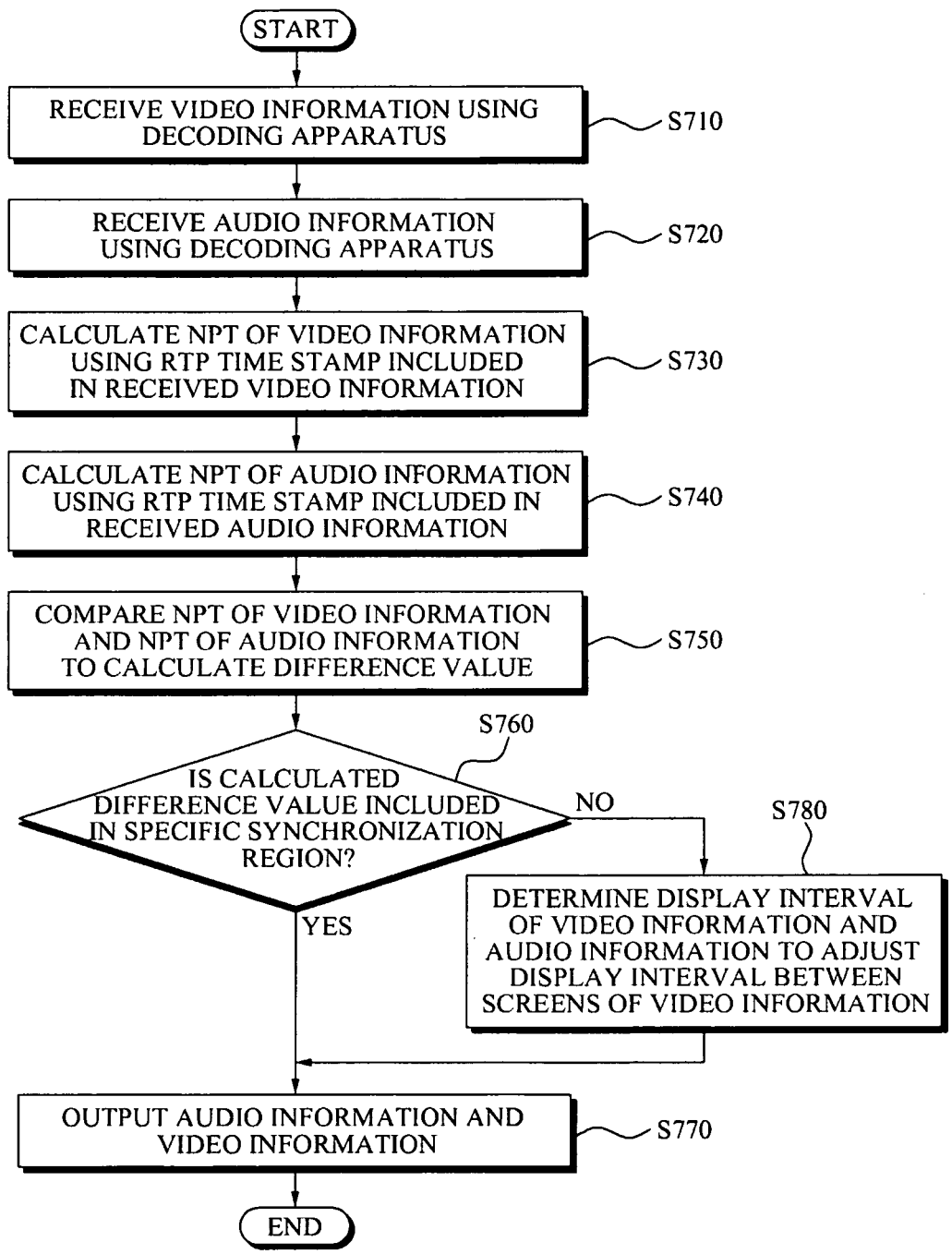
FIG. 7 is a flowchart illustrating a method of supporting synchronization of SVC information and AAC information using an NPT according to an exemplary embodiment of the present invention.

The method is sequentially described based on a functional aspect of a configuration of an apparatus for supporting synchronization of SVC information and AAC information using an NPT with reference to FIG. 7.

Since the method is applied corresponding to a method of using the apparatus for supporting synchronization of the SVC information and the AAC information using the NPT, all functional factors of the apparatus are included. Accordingly, detailed description thereof is omitted and the method is briefly described.

FIG. 7 is a flowchart illustrating a method of supporting synchronization of SVC information and AAC information using an NPT according to an exemplary embodiment of the present invention.

First, in operation S710, the information receiving unit 110 receives video information using a decoding apparatus.

In operation S720, the information receiving unit 110 subsequently receives audio information using the decoding apparatus.

In operation S730, the video information analysis unit 120 calculates the NPT of the video information using an RTP time stamp included in the received video information.

Operation S730 corresponds to an operation of defining, as the NPT of the video information, a value calculated by dividing a value of subtracting a first output screen RTP time stamp of the video information from a specific output screen RTP time stamp of the video information by a sampling rate with respect to an access unit of the video information.

In operation S740, the audio information analysis unit 130 calculates the NPT of the audio information using the RTP time stamp included in the received audio information.

Operation S740 corresponds to an operation of defining, as the NPT of the audio information, a value calculated by dividing a value of subtracting a first output screen RTP time stamp of the audio information from a specific output screen RTP time stamp of the audio information by a sampling rate with respect to an access unit of the audio information.

The specific output screen RTP time stamp of the audio information corresponds to a value of subtracting, from an RTP time stamp value of specific PCM data inputted into a wave-out buffer at a time when the specific output screen RTP time stamp of the audio information is calculated, a value calculated by multiplying a wave-out buffer value and the sampling rate with respect to a basic access unit of the audio information.

In operation S750, the calculation unit 140 subsequently compares the NPT of the video information and the NPT of the audio information to calculate a difference value.

Operation S750 corresponds to an operation of defining, as the difference value, a value of subtracting an NPT value of the audio information from the NPT value of the video information.

In operation S760, the determination unit 150 subsequently determines whether the calculated difference value is included in a specific synchronization region.

In operation S770, the output unit 160 outputs the audio information and the video information when the calculated difference value is determined to be included in the specific synchronization region.

In operation S770, an exemplary embodiment of the present invention outputs the audio information and the video information at screen display intervals based on a screen rate established by a TID of the video information and the audio information.

However, in operation S780, when the calculated difference value is determined to be excluded from the specific synchronization region, the display interval adjustment unit 170 determines a display interval of the video information and the audio information to adjust the display interval between screens of the video information.

A display interval value between screens of the video information may be defined as a value of summing a value calculated by dividing 1000 by an established screen rate and a screen interval size adjustment parameter, and the screen interval size adjustment parameter is defined as a value of multiplying the difference value calculated by comparing the NPT of the video information and the NPT of the audio information, and a scale factor.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, it is possible to calculate an NPT of audio information and video information using an RTP time stamp.

Also, according to the present invention, it is possible to induce an NPT from a time stamp value with respect to a received video and a received audio to provide synchronization between two media.

Also, according to the present invention, it is possible to induce an NPT using only an RTP time stamp by eliminating a separate need for transmitting and processing an RTP Control Protocol Sender Report (RTCP SR) packet of video information and audio information.

Also, according to the present invention, it is possible to reduce a number of User Datagram Protocol (UDP) ports required for transmitting an RTCP packet, and to reduce an amount of control traffic coming into a network since RTCP packet transmission is unnecessary.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus for supporting synchronization of Scalable Video Coding (SVC) information and Advanced Audio Coding (AAC) information using a Normal Play Time (NPT), the apparatus comprising:
    an information receiving unit to receive video information and audio information using a decoding apparatus;
    a video information analysis unit to calculate the NPT of the video information using a Real-time Transport Protocol (RTP) time stamp included in the received video information;
    an audio information analysis unit to calculate the NPT of the audio information using the RTP time stamp included in the received audio information;
    a calculation unit to compare the NPT of the video information and the NPT of the audio information to calculate a difference value;
    a determination unit to determine whether the calculated difference value is included in a specific synchronization region; and
    an output unit to output the audio information and the video information when the calculated difference value is determined to be included in the specific synchronization region.

2. The apparatus of claim 1, wherein the video information corresponds to the SVC information and the audio information corresponds to the AAC information.

3. The apparatus of claim 1, wherein the video information analysis unit defines, as the NPT of the video information, a value of dividing a value calculated by subtracting a first output screen RTP time stamp of the video information from a specific output screen RTP time stamp of the video information by a sampling rate with respect to an access unit of the video information.

4. The apparatus of claim 1, wherein the audio information analysis unit defines, as the NPT of the audio information, a value of dividing a value calculated by subtracting a first output screen RTP time stamp of the audio information from a specific output screen RTP time stamp of the audio information by a sampling rate with respect to an access unit of the audio information.

5. The apparatus of claim 1, wherein the specific output screen RTP time stamp of the audio information corresponds to a value of subtracting, from an RTP time stamp value of specific PCM data inputted into a wave-out buffer at a time when the specific output screen RTP time stamp of the audio information is calculated, a value calculated by multiplying a wave-out buffer value and the sampling rate with respect to a basic access unit of the audio information.

6. The apparatus of claim 1, wherein the calculation unit defines, as the difference value, a value of subtracting an NPT value of the audio information from the NPT value of the video information.

7. The apparatus of claim 1, wherein the output unit outputs the audio information and the video information at screen display intervals based on a screen rate established by a TID of the video information and the audio information.

8. The apparatus of claim 1, further comprising:
    a display interval adjustment unit to determine a display interval of the video information and the audio information to adjust the display interval between screens of the video information when the calculated difference value is determined to be excluded from the specific synchronization region.

9. The apparatus of claim 8, wherein a display interval value between screens of the video information corresponds to a value of summing a value calculated by dividing 1000 by an established screen rate and a screen interval size adjustment parameter.

10. The apparatus of claim 9, wherein the screen interval size adjustment parameter is defined as a value of multiplying the difference value calculated by comparing the NPT of the video information and the NPT of the audio information, and a scale factor.

* * * * *